(12) United States Patent
Janitch

(10) Patent No.: US 9,217,659 B2
(45) Date of Patent: Dec. 22, 2015

(54) GUIDED WAVE RADAR PROBE WITH LEAK DETECTION

(71) Applicant: Magnetrol International, Incorporated, Downers Grove, IL (US)

(72) Inventor: Paul G. Janitch, Lisle, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 307 days.

(21) Appl. No.: 13/653,740

(22) Filed: Oct. 17, 2012

(65) Prior Publication Data

US 2014/0103950 A1    Apr. 17, 2014

(51) Int. Cl.
*G01R 31/20* (2006.01)
*G01F 23/284* (2006.01)

(52) U.S. Cl.
CPC .................................. *G01F 23/284* (2013.01)

(58) Field of Classification Search
CPC ... G01R 1/06772; G01R 1/071; G01R 31/311
USPC ................. 324/754.03, 754.07, 754.1, 754.11
See application file for complete search history.

(56) References Cited

U.S. PATENT DOCUMENTS

| | | | | |
|---|---|---|---|---|
| 5,177,996 A | * | 1/1993 | Sahakian | ............................ 73/40 |
| 5,644,299 A | * | 7/1997 | Cruickshank | .................. 340/617 |
| 5,892,162 A | * | 4/1999 | Spinks et al. | ................. 73/865.8 |
| 6,202,485 B1 | * | 3/2001 | Wien et al. | ................... 73/290 R |
| 7,982,480 B2 | * | 7/2011 | Ghadaksaz | ............... 324/755.02 |
| 2005/0247125 A1 | * | 11/2005 | Williams et al. | ............. 73/304 C |
| 2007/0004238 A1 | * | 1/2007 | Breinlinger et al. | ............ 439/63 |
| 2008/0156633 A1 | * | 7/2008 | Pitts et al. | ...................... 204/165 |

* cited by examiner

*Primary Examiner* — Arleen M Vazquez
*Assistant Examiner* — Dominic Hawkins
(74) *Attorney, Agent, or Firm* — Wood, Phillips, Katz, Clark & Mortimer

(57) ABSTRACT

A probe defining a transmission line for use with a measurement instrument includes a pulse circuit connected to the probe for generating pulses on the transmission line and receiving reflected pulses on the transmission line. The probe comprises a conductive outer sleeve for mounting to a process vessel. A center conductor is coaxial with the outer sleeve for conducting the pulses. A primary seal element between the outer sleeve and the center conductor is spaced a select distance from a near end of the outer sleeve. A secondary seal element between the outer sleeve and the center conductor is spaced proximate the near end of the outer sleeve, to define a generally tubular space between the primary seal element and the secondary seal element. A dielectric insert fills a portion of the tubular space proximate the secondary seal element. A leak detection tube is in the tubular space between the dielectric insert and the primary seal element. The leak detection tube has an inner diameter greater than an outer diameter of the center conductor to define a void. The dielectric insert and the leak detection tube provide a substantially continuous uniform impedance under dry conditions.

20 Claims, 4 Drawing Sheets

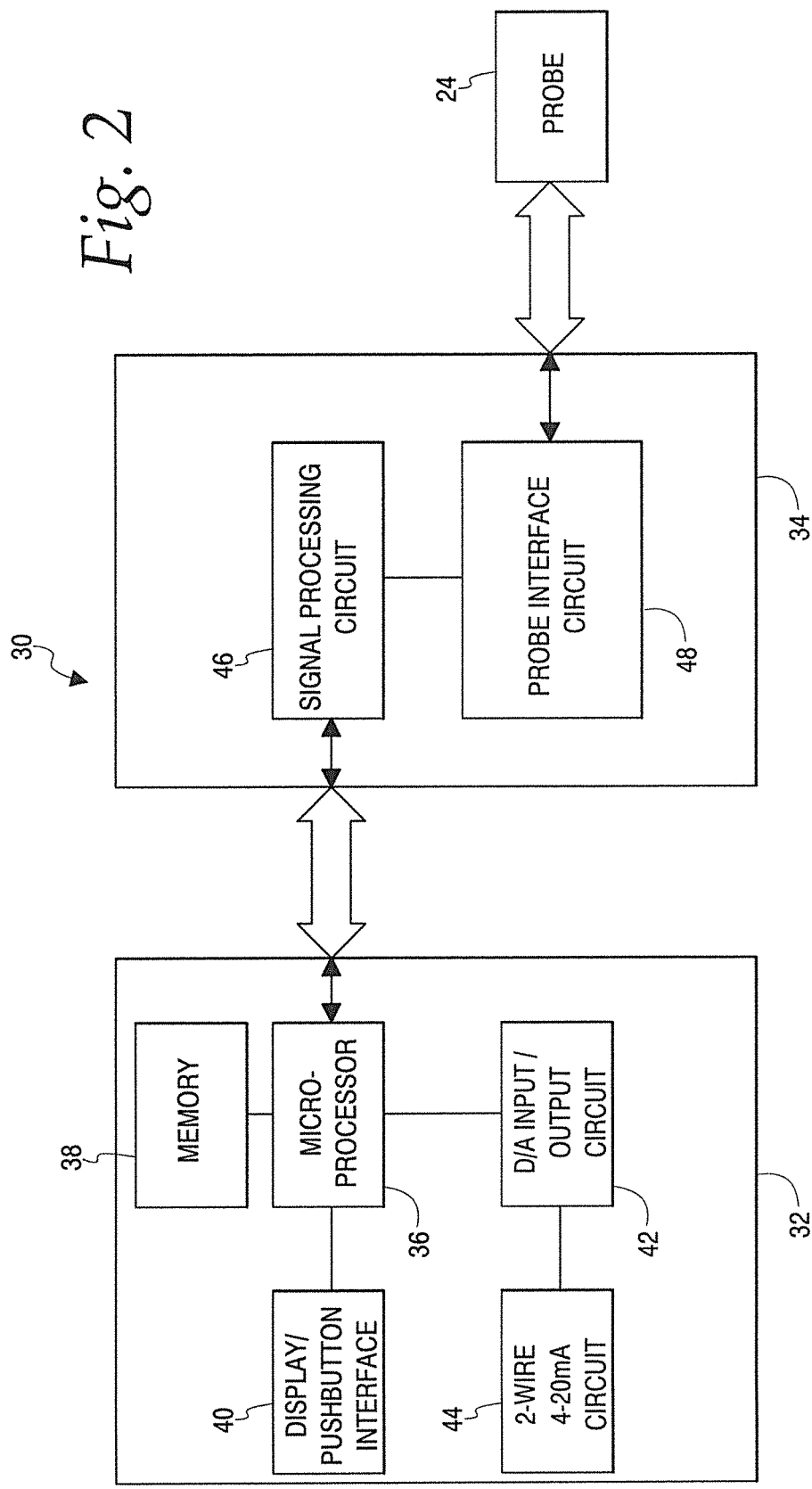

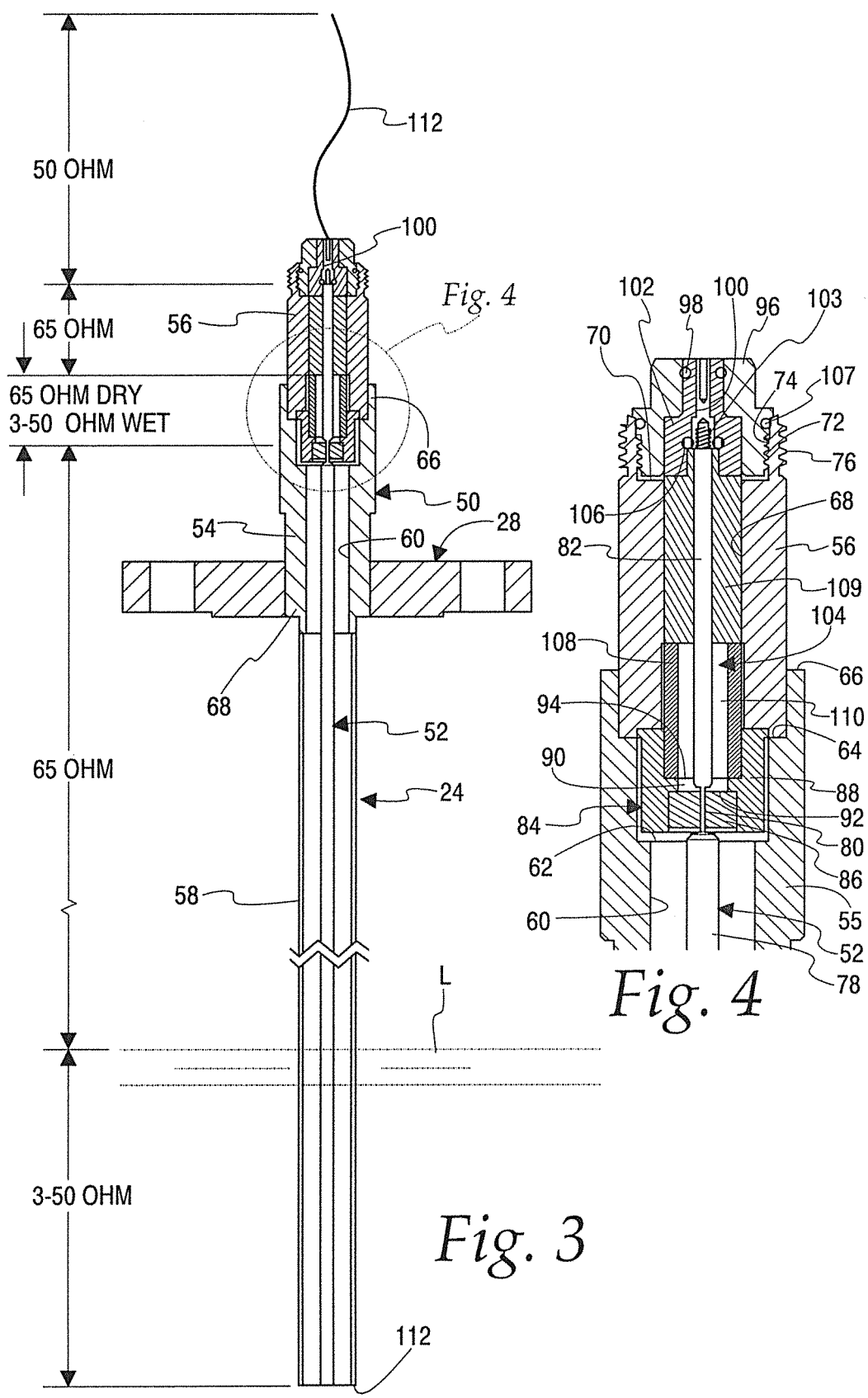

GUIDED WAVE RADAR PROBE WITH LEAK DETECTION

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to a guided wave radar probe with leak detection.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

Knowledge of level in industrial process tanks or vessels has long been required for safe and cost-effective operation of plants. Many technologies exist for making level measurements. These include buoyancy, capacitance, ultrasonic and microwave radar, to name a few. Recent advances in micropower impulse radar (MIR), also known as ultra-wideband (UWB) radar, in conjunction with advances in equivalent time sampling (ETS), permit development of low power and lost cost time domain reflectometry (TDR) instruments.

In a TDR instrument, a very fast pulse with a rise time of 500 picoseconds, or less, is propagated down a probe, that serves as a transmission line, in a vessel. The pulse is reflected by a discontinuity caused by a transition between two media. For level measurement, that transition is typically where the air and the material to be measured meet. These instruments are also known as guided wave radar (GWR) measurement instruments.

In one form, a guided wave radar (GWR) transmitter uses a coaxial probe that functions as an electrical transmission line into the process vessel. The GWR measurement process begins with an electrical pulse that is launched along the probe from one end. A TDR circuit identifies impedance discontinuities along the length of the probe. One source of an impedance discontinuity occurs at the vapor to liquid interface due to the difference in the relative dielectrics of the media. The TDR circuit detects, and locates in time, the reflected signal from the interface. Another source of an impedance discontinuity can be a change in geometry in the transmission line. This is a convenient method for producing a known reference location, called a fiducial (FID) in the probe. The difference in the TDR time measurements of the fiducial to the vapor to liquid interface is used to calculate the liquid level. Another impedance discontinuity exists at the end of the probe (EOP). With this type of probe and TDR circuit an increased impedance creates a positive reflected signal.

Typically, the probe includes an adaptor for mounting to a process vessel. A conductive outer sleeve, which may be part of the adaptor, receives a center conductor coaxial with the outer sleeve for conducting the pulses. Typically, a seal is provided between the outer sleeve and conductor to isolate the process environment from the outside. Under certain high pressure conditions and/or with corrosive or more dangerous materials, codes may require a secondary seal. Typically, the secondary seal is located at a near end of the probe and the primary seal is spaced a select distance therefrom. A dielectric insert fills in the space between the primary and secondary seals to maintain a continuous impedance.

Advantageously, a user will want to know if the primary seal fails. However, this may not be apparent if the failure is only to the primary seal and not the secondary seal.

The present invention is directed to solving one or more of the problems discussed above in a novel and simple manner.

SUMMARY

As described herein, a guided wave radar probe uses a leak detection tube to diagnose a leak through a primary process seal.

There is disclosed in accordance with one aspect of the invention a probe defining a transmission line for use with a measurement instrument including a pulse circuit connected to the probe for generating pulses on the transmission line and receiving reflected pulses on the transmission line. The probe comprises a conductive outer sleeve for mounting to a process vessel. A center conductor is coaxial with the outer sleeve for conducting the pulses. A primary seal element between the outer sleeve and the center conductor is spaced a select distance from a near end of the outer sleeve. A secondary seal element between the outer sleeve and the center conductor is spaced proximate the near end of the outer sleeve, to define a generally tubular space between the primary seal element and the secondary seal element. A dielectric insert fills a portion of the tubular space proximate the secondary seal element. A leak detection tube is in the tubular space between the dielectric insert and the primary seal element. The leak detection tube has an inner diameter greater than an outer diameter of the center conductor to define a void. The dielectric insert and the leak detection tube provide a substantially continuous uniform impedance under dry conditions.

There is disclosed in accordance with another aspect of the invention a probe comprising a conductive outer sleeve for mounting to a process vessel. A center conductor is coaxial with the outer sleeve for conducting the pulses. The center conductor is supported in the sleeve by a primary seal element spaced a select distance from a near end of the outer sleeve and a secondary seal element proximate the near end of the outer sleeve. A dielectric insert in the outer sleeve is proximate the secondary seal element. A leak detection tube in the outer sleeve is between the dielectric insert and the primary seal element. The leak detection tube has an inner diameter greater than an outer diameter of the center conductor to define a void. The dielectric insert and the leak detection tube provide a substantially continuous uniform impedance under dry conditions.

There is disclosed in accordance with a further aspect of the invention a method of detecting leaks in a probe defining a transmission line for use with a measurement instrument including a pulse circuit connected to the probe for generating pulses on the transmission line and receiving reflected pulses on the transmission line. The method comprises providing a probe with a conductive outer sleeve and a center conductor coaxial with the outer sleeve for conducting the pulses, the center conductor being supported in the outer sleeve by a primary seal element spaced a select distance from a near end of the outer sleeve and a secondary seal element proximate the near end of the outer sleeve, and a leak detection tube in the outer sleeve between the primary seal element and the secondary seal element, the leak detection tube having an inner diameter greater than an outer diameter of the center conductor to define a void, wherein the probe has a substantially continuous uniform impedance under dry conditions and impedance proximate the leak detection tube changes responsive to failure of the primary seal; and measuring changes in impedance to detect a leak in the probe.

It is a feature that the probe has an electrical connector at the near end of the outer sleeve. The probe may have substantially uniform impedance under dry conditions from the electrical connector to a distal end of the probe and the substantially uniform impedance is different from impedance at the connector cable to provide a fiducial reference marker at the connector.

It is another feature that the primary seal comprises a glass seal. A metal body supports the glass seal in the probe and may include a shoulder for supporting the glass seal. The metal body may comprise a counter bore receiving the leak detection tube.

Other features and advantages will be apparent from a review of the entire specification, including the appended claims and drawings.

BRIEF DESCRIPTION OF THE DRAWINGS

FIG. 2 is a block diagram of the transmitter of FIG. 1;

FIG. 3 is a sectional view of a guided wave radar probe with leak detection in accordance with the invention;

FIG. 4 is a detailed view taken from FIG. 3; and

DETAILED DESCRIPTION

Figure 1:
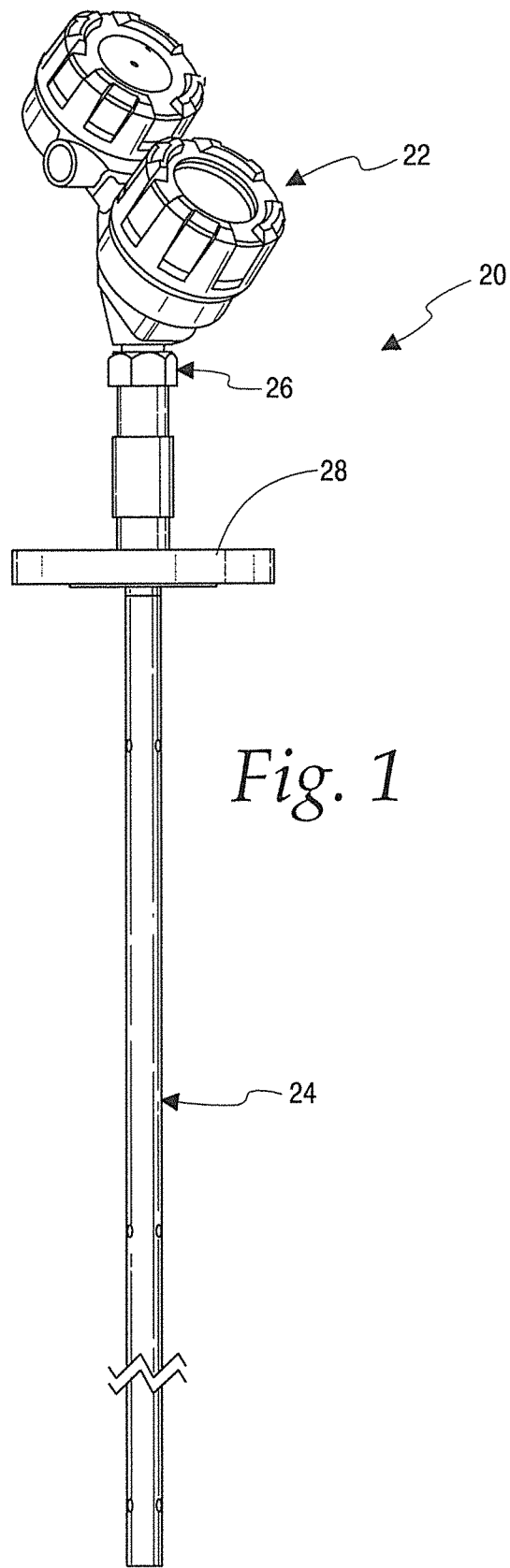
FIG. 1 is an elevation view of a guided wave radar instrument including a probe with a leak detection tube.

Referring to FIG. 1, a process instrument 20 is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is mounted to a process vessel (not shown) using a flange 28. The housing 22 is then secured to the probe 24 as by threading the connector 26 to the probe 24 and also to the housing 22. The probe 24 comprises a high frequency transmission line which, when placed in a fluid, can be used to measure level of the fluid. Particularly, the probe 24 is controlled by a controller 30, described below, in the housing 22 for determining level in the vessel.

As described more particularly below, the controller 30 generates and transmits pulses on the probe 24. A reflected signal is developed off any impedance changes, such as the liquid surface of the material being measured. A small amount of energy may continue down the probe 24.

Guided wave radar combines TDR, ETS and low power circuitry. TDR uses pulses of electromagnetic (EM) energy to measure distance or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. When the EM pulse is sent down the probe it meets the dielectric discontinuity, a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately eight scans are taken per second.

Referring to FIG. 2, the electronic circuitry mounted in the housing 22 of FIG. 1 is illustrated in block diagram form as an exemplary controller 30 connected to the probe 24. As will be apparent, the probe 24 could be used with other controller designs. The controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote power source. Particularly, the two-wire circuit 44 utilizes loop control and power circuitry which is well known and commonly used in process instrumentation. The two-wire circuit 44 controls the current on the two-wire line in the range of 4-20 mA which represents level or other characteristics measured by the probe 24.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 46 processes the ETS signals and provides a timed output to the microprocessor 36, as described more particularly below.

The general concept implemented by the ETS circuit is known. The probe interface circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, target, level, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances. Changes in measured location of the reference target can be used for velocity compensation, as necessary or desired.

Referring to FIGS. 3 and 4, the probe 24 includes a conductive outer sleeve 50 and a center conductor 52 coaxial with the outer sleeve 50 for conducting the pulses.

The conductive outer sleeve 50 is of multi-part construction and includes a process adaptor 54, an extension sleeve 56 and a process tube 58. The process adaptor 54 is generally cylindrical and includes a through opening 60. The through opening 60 includes a first counterbore 62 of a first diameter wider than the through bore 60 and a second counterbore 64 of a greater diameter both at a near end 66. As used herein, the term "near" is used relative to elements toward the "top" in FIG. 3, and the term "distal" refers to elements toward the bottom in FIG. 3. A process adaptor distal end 68 is selectively received in the flange 28 and may be welded or threaded thereto. Alternatively, the process adaptor distal end 68 may be threaded for mounting directly to a process vessel, as necessary or desired. The process tube 58 is welded to the process adaptor 54 at the distal end 68 and is of a length dependent on the height of the process vessel. With a single rod probe the process tube 58 will be omitted.

The extension sleeve 56 is of a diameter corresponding to the process adaptor second counterbore 64 and is received therein and secured either by threading or welding, as necessary. The extension sleeve 56 includes a through bore 68 and a counterbore 70 at a near end 72. The near end 72 includes an inner thread 74 and an outer thread 76. The outer thread 76 is received in the connector 26, see FIG. 1.

The center conductor 52 comprises a probe rod 78 connected via a pin 80 to a connector rod 82. The pin 80 passes through a primary seal assembly 84. The primary seal assembly 84 comprises an annular glass seal 86 received in a metal body 88. The metal body 88 includes a through opening 90 and opposite counterbores defining a distal shoulder 92 and a near shoulder 94. The glass seal 86 is sealed in the metal body through opening 90 and is seated on the distal shoulder 92.

A connector nut 96 is threadably received in the extension sleeve inner thread 74. An electrical terminal 100 passes through an insert 102 in the nut 96 for connecting to the connector rod 82. A first o-ring 98 is disposed between the nut 96 and the insert 102. A second o-ring 106 is disposed between the insert 102 and the electrical terminal 100. A third o-ring 107 is disposed between the extension sleeve inner thread 74 and the connector nut 96. The o-rings 98, 106 and 107 function as a secondary seal. The electrical terminal 100 threadably receives the connector rod at 103 to define a fiducial element.

As described, the secondary seal provided by the connector nut o-rings 98, 106 and 107 is at the probe near end, represented by the extension sleeve near end 72. The primary seal element 84 is spaced a select distance from the near end 72 to define a generally tubular space 104 between the connector nut dielectric insert 102 and the glass seal 86. A dielectric insert 109 fills a portion of the tubular space 104 proximate the connector nut dielectric insert 102. A leak detection tube 108 is in the tubular space 104 between the dielectric insert 109 and the glass seal 86. The leak detector tube 108 has an inner diameter greater than an outer diameter of the connector rod 82 to define a leak detection void 110.

In use, a 50 ohm coax cable 112 is electrically connected to the terminal 100. In accordance with the invention, the geometry and material selection of the various probe components is designed to provide substantially continuous uniform impedance under dry conditions from the fiducial location 103 where the impedance changes from 50 ohm to 65 ohm and then 65 ohm throughout to the end of the probe 112. As illustrated in FIG. 3, a liquid L detected by the probe 24 will lower the impedance typically in the range of 3 to 50 ohm, depending upon the particular liquid material. In accordance with the invention, a failure in the primary seal element 84 may result in process fluid entering into the void 110. This will have the effect of lowering impedance in the probe 24 proximate the void 110. This can be used by control circuitry to detect for a leak in the primary seal 84.

Figure 5:
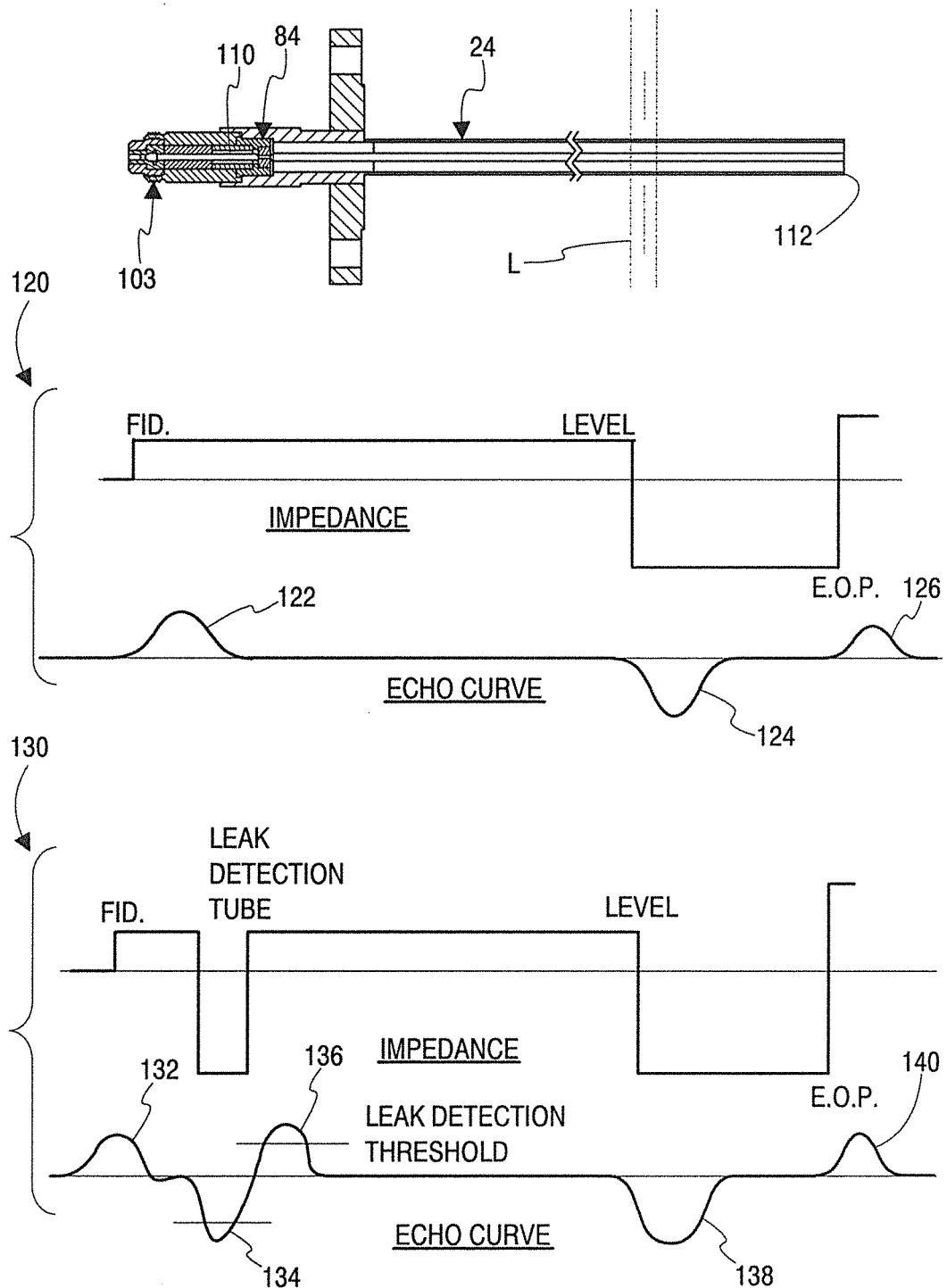
FIG. 5 is a schematic representation of the operation of the probe of FIG. 3 without and with a leak.

With reference to FIG. 5, the probe 24 and an impedance chart and echo curve are aligned to illustrate physically along the probe 24 where impedance changes occur and the resultant echo curve caused by these impedance changes.

Particularly, the normal situation with no leak is illustrated at 120. The impedance increases at the location of the fiducial 103 and then remains substantially constant up to the level surface L and then decreases through to the end of the probe 112. The resultant echo curve measured by the controller 30 shows a positive polarity pulse 122 corresponding with the fiducial 103, a negative polarity pulse 124 corresponding with the liquid level L and a positive polarity pulse 126 corresponding to the end of probe 112. The situation with a leak is illustrated at 130. The difference in this situation is that the impedance curve shows impedance decreasing at the location of the leak detection tube 110 if there is a leak condition. The resultant echo curve shows a positive polarity pulse 132 for the fiducial 103, a negative polarity pulse 134 followed by a positive polarity pulse 136 at opposite ends of the location of the leak detection tube 110, a negative polarity pulse 138 at the liquid level L and a positive polarity pulse 140 at the end of probe 112.

In accordance with the invention, the probe interface circuit 48 and signal processing circuit 46, see FIG. 2, receive the echo curve which is relayed to the microprocessor 36. The microprocessor 36 is programmed to analyze the echo curve to determine if there is a pulse present at the location corresponding to the leak detection tube. Particularly, the microprocessor 36 is programmed to look for the pulses 134 and 136 during a time window corresponding to the location of the leak detection tube 110. As will be apparent, the particular location of the leak detection tube 110 will depend on the size of the various components and the location and size of the leak detection tube 110 relative thereto.

As will be apparent, the probe 24 is illustrated by way of example only. The leak detection feature could be used with various designs of probes for detecting failure of a primary seal resulting in leakage of processed fluid beyond the primary seal. This is done by providing a space to allow leakage of the processed fluid which results in an impedance discontinuity to produce a pulse at a known location.

Thus, as described, an improved guided wave radar probe, which is used for industrial process level measurement, employs a leak detection tube for determining if a primary seal failure has occurred.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A probe defining a transmission line for use with a measurement instrument including a pulse circuit connected to the probe for generating pulses on the transmission line and receiving reflected pulses on the transmission line, the probe comprising:
    a conductive outer sleeve for mounting to a process vessel;
    a center conductor coaxial with the outer sleeve for conducting the pulses;
    a primary seal element between the outer sleeve and the center conductor spaced a select distance from a near end of the outer sleeve;
    a secondary seal element between the outer sleeve and the center conductor spaced proximate the near end of the outer sleeve, to define a generally tubular space between the primary seal element and the secondary seal element;
    a dielectric insert filling a portion of the tubular space proximate the secondary seal element; and
    a leak detection tube in the tubular space between the dielectric insert and the primary seal element, the leak detection tube having an inner diameter greater than an outer diameter of the center conductor to define a void, wherein the dielectric insert and the leak detection tube provide a substantially continuous uniform impedance under dry conditions.

2. The probe of claim 1 wherein the probe has an electrical connector at the near end of the outer sleeve.

3. The probe of claim 2 wherein the probe has substantially uniform impedance under dry conditions from the electrical connector to a distal end of the probe, and the substantially uniform impedance is different from impedance of a connector cable to provide a fiducial reference marker at the connector.

4. The probe of claim 1 wherein the primary seal comprises a glass seal.

5. The probe of claim 4 further comprising a metal body supporting the glass seal in the probe.

6. The probe of claim 5 wherein the metal body includes a shoulder supporting the glass seal.

7. The probe of claim 5 wherein the metal body comprises a counterbore receiving the leak detection tube.

8. A probe defining a transmission line for use with a measurement instrument including a pulse circuit connected to the probe for generating pulses on the transmission line and receiving reflected pulses on the transmission line, the probe comprising:
    a conductive outer sleeve for mounting to a process vessel;
    a center conductor coaxial with the outer sleeve for conducting the pulses, the center conductor being supported in the outer sleeve by a primary seal element spaced a select distance from a near end of the outer sleeve and a secondary seal element proximate the near end of the outer sleeve;
    a dielectric insert in the outer sleeve proximate the secondary seal element; and
    a leak detection tube in the outer sleeve between the dielectric insert and the primary seal element, the leak detection tube having an inner diameter greater than an outer diameter of the center conductor to define a void, wherein the dielectric insert and the leak detection tube provide a substantially continuous uniform impedance under dry conditions.

9. The probe of claim 8 wherein the probe has an electrical connector at the near end of the outer sleeve.

10. The probe of claim 9 wherein the probe has substantially uniform impedance under dry conditions from the electrical connector to a distal end of the probe, and the substantially uniform impedance is different from impedance of a connector cable to provide a fiducial reference marker at the connector.

11. The probe of claim 8 wherein the primary seal comprises a glass seal.

12. The probe of claim 11 further comprising a metal body supporting the glass seal in the probe.

13. The probe of claim 12 wherein the metal body includes a shoulder supporting the glass seal.

14. The probe of claim 12 wherein the metal body comprises a counterbore receiving the leak detection tube.

15. A method of detecting leaks in a probe defining a transmission line for use with a measurement instrument including a pulse circuit connected to the probe for generating pulses on the transmission line and receiving reflected pulses on the transmission line, comprising:
    providing a probe with a conductive outer sleeve and a center conductor coaxial with the outer sleeve for conducting the pulses, the center conductor being supported in the outer sleeve by a primary seal element spaced a select distance from a near end of the outer sleeve and a secondary seal element proximate the near end of the outer sleeve, and a leak detection tube in the outer sleeve between the primary seal element and the secondary seal element, the leak detection tube having an inner diameter greater than an outer diameter of the center conductor to define a void, wherein the probe has a substantially continuous uniform impedance under dry conditions and impedance proximate the leak detection tube changes responsive to failure of the primary seal; and
    measuring changes in impedance to detect a leak in the probe.

16. The method of claim 15 wherein the probe has substantially uniform impedance under dry conditions from a near to a distal end of the probe, and the substantially uniform impedance is different from impedance of a connector cable to provide a fiducial reference marker at the connector.

17. The method of claim 15 wherein the primary seal comprises a glass seal.

18. The method of claim 17 further comprising a metal body supporting the glass seal in the probe.

19. The method of claim 18 wherein the metal body includes a shoulder supporting the glass seal.

20. The method of claim 18 wherein the metal body comprises a counterbore receiving the leak detection tube.

* * * * *